United States Patent
Nedez et al.

(10) Patent No.: US 7,374,737 B2
(45) Date of Patent: May 20, 2008

(54) USE OF A TIO$_2$ COMPOSITION AS CATALYST FOR HYDROLYZING COS AND/OR HCN

(75) Inventors: Christophe Nedez, Salindres (FR); Jean-Louis Ray, Neuilly sur Seine (FR)

(73) Assignee: Axens, Rueil Malmaison (FR)

( * ) Notice: Subject to any disclaimer, the term of this patent is extended or adjusted under 35 U.S.C. 154(b) by 573 days.

(21) Appl. No.: 10/492,175

(22) PCT Filed: Oct. 8, 2002

(86) PCT No.: PCT/FR02/03427

§ 371 (c)(1), (2), (4) Date: Apr. 9, 2004

(87) PCT Pub. No.: WO03/031058

PCT Pub. Date: Apr. 17, 2003

(65) Prior Publication Data

US 2004/0247507 A1    Dec. 9, 2004

(30) Foreign Application Priority Data

Oct. 9, 2001    (FR) .................................. 01 12987

(51) Int. Cl.
*B01D 53/34* (2006.01)
*B01D 53/48* (2006.01)
*B01D 53/54* (2006.01)

(52) U.S. Cl. .............. 423/236; 423/242.1; 423/244.06; 423/244.07; 423/244.1; 423/437.1; 423/564

(58) Field of Classification Search ................ 423/236, 423/242.1, 244.06, 244.07, 244.1, 437.1, 423/564

See application file for complete search history.

(56) References Cited

U.S. PATENT DOCUMENTS

| | | | |
|---|---|---|---|
| 4,422,958 A | 12/1983 | Dupin | |
| 4,427,576 A | 1/1984 | Dupin | |
| 4,511,668 A * | 4/1985 | Nozue et al. | 502/84 |
| 4,544,534 A | 10/1985 | Dupin et al. | |
| 5,227,356 A | 7/1993 | Hess et al. | |
| 5,660,807 A * | 8/1997 | Forg et al. | 423/236 |
| 5,942,201 A * | 8/1999 | Hartmann | 423/244.01 |
| 5,993,763 A * | 11/1999 | Kaizik et al. | 423/236 |

FOREIGN PATENT DOCUMENTS

| | | | |
|---|---|---|---|
| EP | 60741 A | * | 9/1982 |
| EP | 60742 A | * | 9/1982 |

OTHER PUBLICATIONS

The English abstract of EP 514,682 A1 published on Nov. 25, 1992.*
The English abstract of WO 83-02068 A published on Jun. 23, 1983.*

* cited by examiner

*Primary Examiner*—Timothy C. Vanoy
(74) *Attorney, Agent, or Firm*—Millen, White, Zelano, Branigan, P.C.

(57) ABSTRACT

The invention concerns the use of a composition based on TiO$_2$ as a catalyst for hydrolyzing COS and/or HCN in a gas mixture, said composition comprising at least 1% by weight of at least one sulphate of an alkaline-earth metal selected from calcium, barium, strontium and magnesium.

21 Claims, No Drawings

USE OF A TIO$_2$ COMPOSITION AS CATALYST FOR HYDROLYZING COS AND/OR HCN

The invention relates to the field of catalysts. More precisely, it concerns the use of catalysts intended to encourage hydrolysis of carbon oxysulphide (COS) and hydrocyanic acid (HCN) in gas mixtures emanating primarily from co-generation installations.

It will be recalled that co-generation is a technique for the simultaneous production of electricity and useful heat (in the form of steam or combustion gas) from a fuel such as natural gas, wood, etc. This field is constantly growing. The majority of co-generation units are used in installations for the production of electricity.

The gas from a co-generation installation must satisfy very particular specifications linked to the demands of the downstream processes. COS and/or HCN are constituents that are often encountered and which must be eliminated effectively, for example using a catalytic route.

During such transformations, however, the problem must not be exacerbated by extraneous secondary reactions. The CO shift conversion reaction:

$$CO + H_2O \rightarrow CO_2 + H_2 \qquad (1)$$

must in particular be avoided, as it suffers from the major handicap of reducing the calorific value of synthesis gas because of the induced rise in the concentration of $CO_2$ present. A further problem with that reaction (1) is its exothermic nature, which also increases the temperature of the medium.

Further, the catalyst employed to eliminate COS and/or HCN must advantageously not result in the formation of formic acid (HCCOH), which would contaminate the gases present and would also cause accelerated ageing of the catalyst, and thus would reduce its efficiency and service life.

Other side reactions that should also be avoided are those leading to the formation of mercaptans (2), and also of COS from $H_2S$ (3).

$$CO + H_2S + 2H_2 \rightarrow CH_3SH + H_2O \qquad (2)$$

$$CO + H_2S \rightarrow COS + H_2 \qquad (3)$$

In the specific case in which heavy oil residues are used, traces of carbonyl metals such as $Fe(CO)_5$ or $Ni(CO)_4$ are encountered. An effective catalyst for the hydrolysis of COS and HCN must preferably be inert towards those organometallic complexes, so that it is not poisoned during use under those circumstances.

A COS and HCN hydrolysis catalyst must also retain its qualities in the presence of ammonia and hydrochloric acid, which can also be encountered in the gas to be treated.

Finally, care should be taken that the catalyst to be used is not itself toxic to human and environmental health.

Typically, the gas to be treated has concentrations of $H_2$, CO, $H_2S$ and $H_2O$ in the range 10% to 40%, 15% to 70%, 200 ppm to 3% and 0.5% to 25% respectively. The COS content is normally in the range from 20 to 3000 ppm, and that of HCN can reach 1000 ppm. Respective concentrations of $NH_3$ and HCl in the range 0 to 2% and in the range 0 to 500 ppm have been encountered. All of the concentrations cited above and which will be cited below are expressed by volume. COS and HCN conversion generally requires a temperature in the range 100° C. to 280° C. and a pressure that can be beyond 60 bars.

Different COS or HCN hydrolysis catalysts can be found in the literature. K/alumina, CoMo/alumina, NiMo/alumina and Cr/TiO$_2$ type formulations are known. However, their performance is generally mediocre in the case of joint hydrolysis of COS and HCN, and give rise to a high level of CO shift conversion. Alumina-based catalysts also induce formic acid formation reactions, and even mercaptan formation. Metal carbonyl decomposition is also observed in all prior art catalysts. Finally, certain of those catalysts, for example those doped with chromium, cause acute problems as regards human and environmental health.

The aim of the invention is to propose COS and HCN hydrolysis catalysts that can be used in co-generation installations, which have high efficiency and which are free of the disadvantages cited above.

To this end, the invention concerns the use of a composition based on TiO$_2$ as a catalyst for hydrolyzing COS and/or HCN in a gas mixture, said composition comprising at least 1% by weight, preferably at least 5%, of at least one sulphate of an alkaline-earth metal selected from calcium, barium, strontium and magnesium.

In a preferred implementation of the invention, said composition comprises at least 40% by weight of TiO$_2$, preferably at least 60%.

Said sulphate is preferably calcium sulphate.

Preferably, the composition also comprises at least one compound selected from clays, silicates, titanium sulphate and ceramic fibres in a total content of 30% by weight or less, preferably in the range 0.5% to 15%.

Preferably, said composition comprises at least 60% by weight of TiO$_2$, at least 0.1% by weight and at most 20% by weight, advantageously at most 15%, preferably at most 10%, of a doping compound or a combination of doping compounds selected from compounds of iron, vanadium, cobalt, nickel, copper, molybdenum and tungsten.

The doping compound or compounds is/are preferably oxides.

Preferably, said catalyst has been formed by extrusion.

Its transverse section can, for example, be in the range 0.5 to 8 mm, preferably in the range 0.8 to 5 mm.

In a preferred application of the invention, the gas mixture derives from a co-generation installation.

As will become clear, the invention consists of using a composition based on titanium oxide and containing at least one alkaline-earth metal sulphate, possibly also other compounds, as a catalyst to assist COS and HCN hydrolysis reactions, in particular in a co-generation installation. At the same time, the other side reactions of formic acid formation, the generation of mercaptans and decomposition of carbonyl metals are advantageously limited compared with those observed with prior art catalysts in this type of application.

In accordance with the invention, a first principal component of the product for use as a catalyst is titanium oxide TiO$_2$. The other principal component is an alkaline-earth metal sulphate selected from the group formed by calcium, barium, strontium and magnesium. The function of said sulphate is to produce a better compromise between the desired conversions and minimizing side reactions.

Advantageously, the titanium oxide represents at least 40% of the composition weight, preferably at least 60%.

The preferred alkaline-earth sulphate is calcium sulphate.

The minimum amount of alkaline-earth sulphate in the composition is 1% by weight, preferably 5%.

In addition to titanium oxide and alkaline-earth sulphate, the composition can also comprise at least one compound selected from clays, silicates, titanium sulphate and ceramic fibres. The total amount of the compound or compounds does not exceed 30% by weight, and is preferably in the range 0.5% to 15%.

In a particularly advantageous variation of the invention, the composition comprises:

at least 60% by weight of titanium oxide;

at least 5% by weight of alkaline-earth sulphate;

at least 0.1% and at most 20% by weight, advantageously at most 15%, and preferably at most 10% of a doping compound or a combination of doping compounds selected from compounds of iron, vanadium, cobalt, nickel, copper, molybdenum and tungsten, for example in the form of oxides.

The dopant(s) can be added when the titanium oxide and alkaline-earth sulphate are being formed, or subsequent to that operation. In the latter case, dry impregnation of one or more solutions of metal salts is preferable, preparation being completed in a conventional manner by a thermal operation.

The catalyst can be in any known form: powder, beads, extrudates, monoliths, crushed material, etc. The preferred form in the case of the invention is the extrudate, either cylindrical or polylobed. When forming by mixing followed by extrusion, the transverse section is advantageously in the range 0.5 to 8 mm, preferably in the range 0.8 to 5 mm.

We shall now describe different examples of compositions for use in the invention, their preparation processes and their properties in the case of the envisaged use, namely as a catalyst to carry out COS and HCN hydrolysis, in gas mixtures based on CO and $H_2$ typically comprising steam, COS, $H_2S$ and possibly HCN, $NH_3$ and HCl.

Three catalysts with compositions in accordance with the invention, named A, B and C, were produced using the procedure below.

A suspension of lime was added to a suspension of titanium oxide obtained by hydrolysis and filtration in a conventional ilmenite sulphuric acid attack process, to neutralize all of the sulphates present. Once completed, the suspension was dried at 150° C. for one hour. The powder was mixed in the presence of water and nitric acid. The paste generated was extruded through a die to obtain extrudates with a cylindrical shape. After drying at 120° C. and calcining at 450° C., the diameter of the extrudates was 3.5 mm, and the specific surface area was 116 $m^2/g$ and a total pore volume of 36 ml/100 g. The $TiO_2$ content was 88% and the $CaSO_4$ content was 11%; the loss on ignition made the balance up to 100%. This catalyst was termed A.

Catalyst B resulted from dry impregnation of an aqueous nickel nitrate solution onto A, followed by drying at 120° C. and calcining at 350° C. B then had a nickel content (expressed as NiO) of 2.1% by weight.

Catalyst C resulted from dry impregnation of an aqueous copper nitrate solution onto A, followed by drying at 120° C. and calcining at 350° C. C then had a nickel content (expressed as CuO) of 4% by weight.

At the same time, three prior art catalysts termed D, E and F were selected; they were in the form of cylindrical extrudates. D was a catalyst based on titanium oxide and doped with chromium oxide, but did not contain any sulphates. E and F were alumina-based catalysts.

The compositions and specific surface areas of catalysts A to F are shown in Table 1.

TABLE 1 characteristics of study catalysts

| Catalyst | A | B | C | D | E | F |
|---|---|---|---|---|---|---|
| $TiO_2$ (%) | 88.0 | 86.2 | 84.5 | 90.0 | — | — |
| $Al_2O_3$ (%) | — | — | — | — | 80 | 80 |
| $CaSO_4$ (%) | 11.0 | 10.8 | 10.6 | — | — | — |
| NiO (%) | — | 2.1 | — | — | — | 3.1 |
| CuO (%) | — | — | 4.0 | — | — | — |
| CoO (%) | — | — | — | — | 3.4 | — |
| $MoO_3$ (%) | — | — | — | — | 14.2 | 14.5 |
| $Cr_2O_3$ (%) | — | — | — | 6.2 | — | — |
| specific surface area ($m^2/g$) | 116 | 105 | 101 | 72 | 177 | 191 |
| diameter (mm) | 3.5 | 3.5 | 3.5 | 3.5 | 1.6 | 1.6 |

The results obtained using these various catalysts was then studied during the treatment of a gas with the following composition, representative of that which can be found in gas from a cogeneration installation (all percentages are given by volume):

30% to 40% for CO and $H_2$;

2% to 18% for $H_2O$;

0 to 2000 ppm for COS, with a $H_2S$ concentration about ten times that of COS but never less than 2000 ppm;

0 to 500 ppm for HCN;

0 to 1000 ppm for $NH_3$;

0 to 150 ppm for HCl.

The temperature of the gas was fixed at between 180° C. and 280° C., and their pressure was between 1 and 10 bars. The hourly space velocity (HSV, the ratio between the weight of feed treated per unit time to the weight of catalyst used) was fixed between 2950 and 5900 $h^{-1}$.

EXAMPLE 1

A first series of experiments was conducted in the absence of HCN, and also in the absence of $NH_3$ and HCl, the concentration of COS at the reactor inlet being 2000 ppm.

With the temperature at 220° C., the pressure at 1 bar and the water content at the reactor inlet at 8% with a HSV of 5900 $h^{-1}$, the COS conversions obtained with catalysts A, B, C, D, E and F were 95.5%, 97.5%, 96.2%, 78.5%, 56.6% and 57.4% respectively.

With the temperature at 210° C., the pressure at 1 bar and the water content at the reactor inlet at 18% with a HSV of 5900 $h^{-1}$, the COS conversions obtained with catalysts A, D and E were 98.2%, 72.4% and 52.1% respectively.

EXAMPLE 2

A second series of experiments was conducted in the presence of 500 ppm of HCN, but in the absence of $NH_3$ and HCl, the concentration of COS at the reactor inlet being 2000 ppm.

With the temperature at 220° C., the pressure at 1 bar and the water content at the reactor inlet at 8% with a HSV of 5900 $h^{-1}$, the COS conversions obtained with catalysts A, B, C, D, E and F were 85.8%, 90.5%, 90.2%, 68.5%, 40.2% and 41.8% respectively. At the same time, the HCN conversions obtained with the same catalysts were 95.5%, 98.2%, 97.1%, 96.0%, 85.2% and 81.3% respectively. At the same time, the extraneous production of $CO_2$ via CO shift conversion, was 0.15%, 0.2%, 0.2%, 1.1%, 1.4% and 2.3% respectively, the temperature increase was less than 1° C. for catalysts A, B and C, but 7° C., 10° C. and 15° C. for catalysts D, E and F. Further, 10%, 6% and 15% of the transformed HCN was in fact hydrogenated to $CH_4$ with D, E and F respectively, wherein less than 1% was transformed with A, B and C.

With the temperature at 220° C., the pressure at 1 bar and the water content at the reactor inlet at 15% with a HSV of 5900 h$^{-1}$, the COS conversions obtained with catalysts A, D, E and F were 94.0%, 78.4%, 50.4% and 48.7% respectively. The respective HCN conversions obtained with these same four catalysts were 95.7%, 95.5%, 88.6% and 84.9%. At the same time, the extraneous production of $CO_2$ via CO shift conversion, was 0.15%, 0.7%, 3.3% and 3.1% by volume respectively, the temperature increase being less than 1° C. for catalyst A, but 5° C., 17° C. and 17° C. for catalysts D, E and F. The remarks made in Example 1 regarding methane formation are also applicable in this example.

With the temperature at 180° C., the pressure at 10 bars and the water content at the reactor inlet at 6% with a HSV of 2950 h$^{-1}$, the COS conversions obtained with catalysts A and B were 94.6% and 97.1% respectively. At the same time, the HCN conversions obtained with the same catalysts were 90.8% and 93.7% respectively. No significant formation of $CO_2$, $CH_4$ or any particular temperature rise was observed.

EXAMPLE 3

A third series of experiments was conducted in the presence of 500 ppm of HCN and 2000 ppm of $NH_3$, the concentration of COS at the reactor inlet being 2000 ppm.

With the temperature at 220° C., the pressure at 1 bar and the water content at the reactor inlet at 15% with a HSV of 5900 h$^{-1}$, the COS conversions obtained with catalysts A, D and E were 94.1%, 74.4% and 41.4% respectively. At the same time, the HCN conversions obtained with the same three catalysts were 95.8%, 91.5% and 78.4% respectively.

EXAMPLE 4

A fourth series of experiments was conducted in the presence of 500 ppm of HCN and 150 ppm of HCl, the concentration of COS at the reactor inlet being 2000 ppm.

With the temperature at 220° C., the pressure at 1 bar and the water content at the reactor inlet at 8% with a HSV of 5900 h$^{-1}$, the COS conversions obtained with catalysts A, D and E were 70.6%, 58.4% and 25.9% respectively. At the same time, the HCN conversions obtained with the same three catalysts were 90.5%, 51.0% and 30.7% respectively. When the supply of HCl to the reactor was cut off, the rest of the conditions remaining unchanged, the performance of A in COS hydrolysis slowly returned to normal, contrary to that of D which only partially recovered its initial level, while E had been visibly damaged.

From these observations, it can be seen that the catalysts of the invention present an optimum compromise between very high conversion of COS and HCN, insensitivity to the presence of $NH_3$, resistance to and reversibility on exposure to HCl for COS conversion (that of HCN being unaffected by HCl), and a remarkable limitation to the formation of $CO_2$ and $CH_4$.

The prior art catalysts, in contrast, had substantially lower conversions than with COS and usually for HCN and all caused the formation of undesirable compounds, as well as increased extraneous exothermicity. Further, exposure to by-products that could conventionally be encountered ($NH_3$, HCl), was difficult to accommodate and even caused severe damage to catalytic performance.

The invention claimed is:

1. A catalytic process comprising hydrolyzing COS and/or HCN in a gas mixture in contact with a composition comprising $TiO_2$ and, at least 1% by weight, of at least one sulphate of an alkaline-earth metal selected from calcium, barium, strontium and magnesium, said gas mixture being derived from a co-generation process and comprising by volume 20-3000 ppm of COS, up to 1000 ppm of HCN, 10% to 40% of H2, 15 to 70% of CO, 200 ppm to 3% of $H_2S$, and 0.5% to 25% of $H_2O$.

2. A process according to claim 1, characterized in that the composition comprises at least 40% by weight of TiO2.

3. A process according to claim 2, wherein the composition comprises at least 60% by weight of TiO2.

4. A process according to claim 1, characterized in that said sulphate is calcium sulphate.

5. A process according to claim 1, characterized in that the composition also comprises at least one compound selected from clays, silicates, titanium sulphate and ceramic fibres in a total content of 30% by weight or less.

6. A process according to claim 5, wherein said at least one compound selected from clays, silicates, titanium sulphate and ceramic fibers has a total content in the range of 0.5% to 15%.

7. A process according to claim 1, characterized in that the composition comprises at least 60% by weight of $TiO_2$, at least 0.1% by weight and at most 20% by weight, of a doping compound or a combination of doping compounds selected from compounds of iron, vanadium, cobalt, nickel, copper, molybdenum and tungsten.

8. A process according to claim 7, characterized in that the doping compound or compounds is/are oxides.

9. A process according to claim 7, wherein the total composition comprises at most 15% by weight of said doping compound or combinations of doping compounds.

10. A process according to claim 7, wherein the total composition comprises at most 10% by weight of said doping compound or combinations of doping compounds.

11. A process according to claim 1, characterized in that the catalyst has been formed by extrusion.

12. A process according to claim 11, characterized in that the transverse section of the catalyst is in the range of 0.5 to 8 mm.

13. A process according to claim 12, wherein the transverse section of the catalyst is in the range of 0.8 to 5 nm.

14. A process according to claim 1, wherein said composition comprises at least 5% of said at least one sulphate of an alkaline-earth metal.

15. A process according to claim 1, wherein HCN is present in the gas mixture.

16. A process according to claim 1, wherein the $H_2$ and CO are each present in the gas mixture in a concentration of at least 30% by volume.

17. A catalytic process comprising hydrolyzing COS and/or HCN in a gas mixture comprising contacting said gas mixture with a composition comprising $TiO_2$ and, at least 1% by weight, of at least one sulphate of an alkaline-earth metal selected from calcium, barium, strontium and magnesium, said gas mixture being derived from a co-generation process and consisting of volume 20-3000 ppm of COS, up to 1000 ppm of HCN, 10% to 40% of H2, 15 to 70% of CO, 200 ppm to 3% of H2S, and 0.5% to 25% of H2O, a 0 to 2% of $NH_3$ and 0 to 500 ppm of HCl.

18. A process according to claim 17, wherein HCN is present in the gas mixture.

19. A process according to claim 17, wherein the $H_2$ and CO are each present in the gas mixture in a concentration of at least 30% by volume.

20. A process comprising conducting a cogeneration process, withdrawing a gas mixture from said cogeneration process and conducting the process of claim 1 on said gas mixture.

21. A process according to claim 20, wherein said cogeneration is conducted with a heavy oil residue as fuel.

* * * * *